United States Patent [19]
Henderson

[11] 4,158,928
[45] Jun. 26, 1979

[54] FISH LURE DESNAGGER

[76] Inventor: Homer I. Henderson, 2220 Live Oak St., San Angelo, Tex. 76901

[21] Appl. No.: 828,854

[22] Filed: Aug. 29, 1977

[51] Int. Cl.² ............................................. A01K 97/00
[52] U.S. Cl. ................................................... 43/17.2
[58] Field of Search .............................. 43/17.2, 42.7

[56] References Cited
U.S. PATENT DOCUMENTS

| | | | |
|---|---|---|---|
| 2,809,460 | 10/1957 | Taylor | 43/17.2 |
| 3,029,542 | 4/1962 | Agostini | 43/17.2 |
| 3,224,132 | 12/1965 | Frantz | 43/17.2 |
| 3,352,049 | 11/1967 | Agostini | 43/17.2 |

Primary Examiner—James G. Smith

[57] ABSTRACT

The prior art fish lure desnaggers employed only vertical forces generated by a falling compact weight. The desnagger of this disclosure utilizes not only the vertical forces of a falling weight, but at the will of the Operator, the more effective horizontal forces simultaneously generated by a relatively long, falling weight, oscillating about its center of oscillation. The energy for these forces being supplied by the Operator, at the water's surface, by means of a lowering, actuating, retrieving, cord attached to the desnagger.

1 Claim, 6 Drawing Figures

FISH LURE DESNAGGER

SUMMARY OF THE INVENTION

The habitat of fishes, generally, is an area wherein they have cover, hence protection. This is usually submerged:-trees, brush, rocks, debris, etc. The food of sport fish:-minnows, crustaceans, forage fish, etc. Thus a fish's requirements—food and protection—are found at the same place. Naturally, this is where the fish are, and of course, the fishermen. When an angler gets his lure down to where the fish are, his lure is down to where the snags are, consequently many a snagged lure. Further, when a sport fish is hooked it instinctively heads for cover, and darts amoung and around trees, brush etc. which greatly magnifies the probability of a snagged lure, with loss of fish and lure.

The prior art desnaggers comprise a compact weight with means to slidably attach the angler's fish line to the weight, to guide it to the snagged lure. Their only force on the snagged lure is the impact of the falling weight, nevertheless, they were often successful, but moreoften unsuccessful. Today's multihook lures experience complicated snags.

The present invention, based on the physical principle of "center of oscillation" has added horizontal forces to the hammer-blows of a falling weight, horizontal forces that are randomly in all directions around the compass. Further, it has a lower section with a diameter, much smaller than the prior art desnaggers, permitting it to penetrate brush and tight apertures. It is a streamlined unit that falls very rapidly, hence more impact for a given weight. It's main member is a central tube, that is slotted longitudinally to receive the snagged lure's fish line therein, for guidance to the snagged lure, The tube is preferably weighted. As with the prior art, the desnagger has a cord attached, as a means for lowering, actuating, and retrieving. The oscillation of the device around its center of oscillation, is generated by the Operator jerking on the lowering cord. Thus, random horizontal forces can be acting simultaneously, with downward impact forces, or upwardly lift forces on the cord. The central tube with the fish line running through it, makes for a much better journey to the snagged lure. In the prior art, weight-on-a-string, the weight would swing like a pendulum to encircle trees, limbs, etc., and lodge in tree crotches. The tube of this invention, on the other hand, is restrained from sharp fall-offs, or erratic sharp turns, by the taut fish line. An experienced Operator can "inch" the desnagger of this invention completely around a tree, provided the fish line encircles the tree in a spiral (helix) having a pitch of 4 feet, or more per revolution; the tube appears to be an outside chord.

BODY OF THE SPECIFICATION

Figure 1:
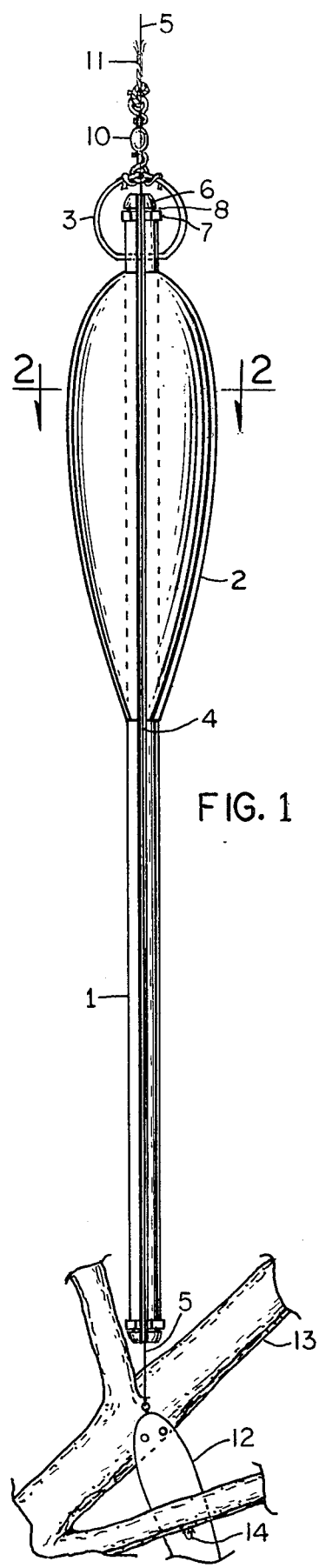
FIG. 1 is an elevational view of the device, shown in a desnagging position, with the fish line enclosed within the central tube for guidance to the snagged lure, and the desnagger's manipulating cord atttached thereto and extending upwardly to the Angler for manipulation.
Figure 2:
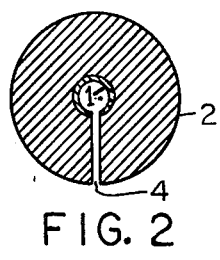
FIG. 2 is a horizontal sectional view of the desnagger showing the central tubing and the streamlined mass of lead.
Figure 4:
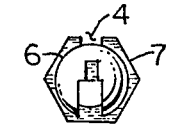
FIG. 4 is a top end view of FIG. 3 showing the locking nut in position for fish line insertion into the slotted tube member.
Figure 5:
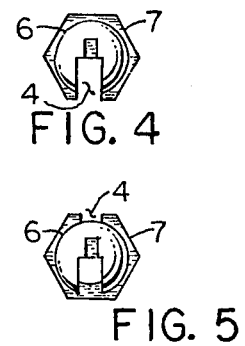
FIG. 5 is a top end view, the same as FIG. 4, except showing the locking nut in the position for locking the fish line within the slotted tube member.
Figure 3:
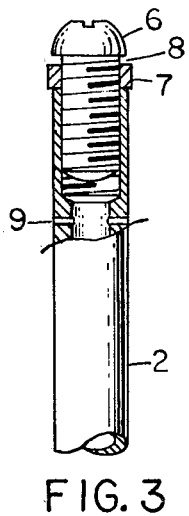
FIG. 3 is an enlarged detail, partly in section, showing the upper end of the desnagger, and the means for locking the fish line within the central tube.

Referring to FIG. 1 of the drawing, the desnagger is shown at about natural scale. The main member is the central tube 1, which has a streamlined lead mass 2 bonded to the tube, it being molten cast in a tube-enclosing mold. Although it is desirable that the mass 2, be streamlined, it is not essential for satisfactory performance. Both ends of the tube 1 are bored and tapped to receive a screw 6. A nut 7 is placed on each screw 6, and screwed fully onto the screw until it is firmly against the screw head. Each screw 6 is then screwed tightly into its respective tube end, and subsequently backed-out ½ of a revolution, (or 1½ revolutions). Each screw is then locked in this position by pinning, or soldering, welding, or cementing. After the screws are locked in place the nuts 7, are then screwed firmly against the tube 2. The bail holes 9 are then drilled in the upper tube end. Whereupon the assembly is placed in a milling machine, and using a deep slotting cold saw the longitudinal narrow slot 4 is cut to mid-section depth, throughout its full length, including the end screws 6. The gap 8, is for nut 7, manipulation.

The bail 3 is a wire that is inserted through the drilled holes 9, and its ends are secured to the lower eye of the swivel 10. The desnagger's manipulating cord 11, is attached to the upper eye of the swivel 10. If the fish line 5 is now placed in the slot 4, it completes the representation of FIG. 1. The line 5 is secured within the slot 4, by screwing the nuts 7 against their respective nut heads. When it is desired to remove line 5, the nuts 7 are screwed toward the tube 2 (½ turn) to tightly engage the tube 2.

Figure 6:
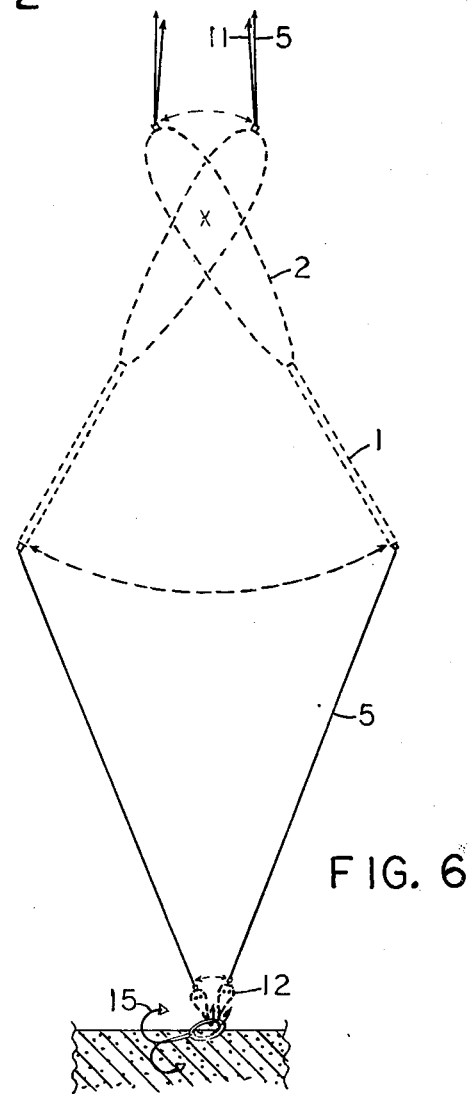
FIG. 6 is a phantom sketch showing the desnagger oscillating around its center of oscillation, upon manipulation by the Angler, by means of the the manipulating cord.

Referring to the diagram FIG. 6, the advantage of a long top-weighted central tube, as the main member of a desnagger becomes apparent. Jerks on the actuating cord 11 cause the tube to oscillate around its center of oscillation X. The movement of the lower end of the tube, in this particular model is 3½ times the movement of the upper end. The rate of oscillation is of the order of two per second, depending primarily upon the energy of jerk, total mass, and total tube length. The line force at the snagged lure 12 is also dependent upon the force of jerk, as well as the angle of the tube at time of jerk. Should the desnagger be vertical at the instant of jerk, of course all of the force at the lure 12 would be vertical. It is obvious that vertical forces, up or down, will not desnag the lure 12, in FIG. 6. FIG. 6 shows the desnagger oscillating in the plane of the paper, actually the oscillations are randomly in every vertical plane. The line 5, FIG. 6 is taut, but as the desnagger approaches the vertical, the line 5 will become slack. When the desnagger randomly rotates to an oscillation plane perpendicular to the paper, and with line 5 progressing from taut to slack, there is a good chance for desnagging.

In FIG. 1, the simply snagged lure 12, with its hook embedded in a limb of a submerged tree 13, the prior art desnaggers would have a poor chance of desnagging the lure; the tree limbs would prevent a large diameter desnagger from reaching the lure. With this invention, however, the oscillating, small diameter, guided tube 1, would be directed over and around to impinge with force the lure 12, and should be a sure success.

The art of manipulating this new desnagger to generate oscillations as shown in FIG. 6 is an essential part of its success: (1) In all cases the Angler should position himself vertically above the snag, with the taut line 5 being vertical. (2) The line 5 should be placed in the tube 1, and locked, by the nuts 7. (3) For a right-handed angler it is better to handle line 5 with his left hand, and the desnagger cord 11, with his right hand. (4) It has been found best to position his left hand level with his waist, when line 5 is taut, and to put one or two wraps of line 5 around his hand for easy gripping of the small diameter monofilament line. (5) Using his right hand, the Angler lowers the desnagger with its cord 11 until it is stopped by an obstruction, which may or may not be the snagged lure 12. If the obstruction should be the snagged lure, it may become unsnagged by slacking off of the line 5, by lower-his left hand. (6) If the lure is not desnagged by the first impact, the Angler should wrap one turn of the cord 11, around his right hand, with cord taut when his right hand is also waist high. He can then raise and lower his right arm rapidly substantially in synchronism with the period of oscillation of the desnagger to give the desnagger a jigging action, similar to the up and down action of an earth-boring drill, while the left hand keeps the line 5 taut. Of course the lure cannot become unsnagged if it is held snuggly snagged by the left hand. To prevent this:-when the descending right hand approaches the Angler's waist, he should then also lower his left hand in synchronism with his right hand. This slack in both lines permits the desnagger to be supported by the snag, and to pivot downwardly around its bottom end, thus providing a long lever arm for subsequent oscillation-inducing jerks, facilitating the initiation of large energetic oscillations. This should be repeated many times with variations in energy, hight of right hand raise, and with short (6-inch) jiggings just above the snagged lure with a little slack in line 5. If the lure is still snagged he should try letting eneough slack in both lines, about one foot, so that the desnagger lays over horizontally. If the desnagger is jerked violently from the horizontal position it puts considerable horizontal stress on the lure 12, through the line 5 and can be the start of large amplitude oscillations. This should be repeated several times in an endeavor to get the desnagger to become horizontal in many different directions. With experience the Angler can ascertain if the lure moves, and whether the desnagger is striking the lure or an obstacle above the lure. If it is quiet, sound-wise, the Angler can tell from the impact sound of the desnagger if it is impacting, rock, wood, or mud. It is highly beneficial, if the Angler will practice with this desnagger on dry land, desnagging lures in every predictable situation; as well as in clear water where he can see the action, and convince himself that the under-water, is substantially the same as in-air action. He should practice feeding, (inching) the desnagger into tight openings, and around tree trunks.

This desnagger, as a bonus, makes an excellent depth sounder. Due to its streamlining, it falls rapidly in water. The desnagger cord 11 can be spooled on an inexpensive fly rod type reel, single action, drag type, which reel is mounted on a short rod for a handle. For water depth measurement, the Angler reels the desnagger from bottom, counts the number of turns to the surface, and multiplies the number of turns by the average length of a single turn. The fast fall of this desnagger makes it a good tool to determine the bottom condition, so valuable in fish finding. When the desnagger is allowed to fall freely onto a rock bottom, it makes an impact sound that is clearly heard, with moderate depths. The sound from a gravel bottom is less distinct, but normally discernable. If the bottom is sand or mud, particles of the same are usually found on, and in, the desnagger when it is brought to the surface. The efficiency of its sound generating is attributed to its steel impact face, and to its long, vibrating, vertical tube.

It is to be understood that certain engineering modifications in the construction and arrangement of parts thereof can be made without departing from the scope of the appended claims. For instance, it is important that the tube 1, be of the smallest diameter practical to facilitate the desnagger's entrance into narrow openings, but it still must be able to withstand the hammering of the total mass of the device. Replacing the tube 1, with a solid steel rod of smaller diameter is feasible, but more expensive. The rod could be of tempered spring steel, to permit some flexing without becoming permanently bent; flexing would facilitate the encircling of tree, and entering a tortous brush mass. The ends of the steel rod could be drilled and threaded to accept the screws 6, or the ends could threaded to receive the slotted nuts 7.

When fishing water that has a rocky bottom it is desirable to put a slitted, elastomer cap on the bottom screw head 6, to protect the fishing line from hammer damage. When using such a unit for depth sounding, the unit may be turned upside-down, and the actuating cord tied to the protected end, thereby permitting the un-, cushioned end to sound the water's bottom.

I claim as my invention:

1. An oscillating fishing lure desnagger comprising:
   a tube, slotted throughout its length, to receive and to accommodate a fish line, which fish line, when a lure is snagged, guides the desnagger to the snagged line;
   the said slotted tube having fish line retaining means at each end thereof;
   a high density weight secured to the upper section of said slotted tube, and also slotted to conform with the slot in the slotted tube;
   a fisherman's manipulating cord attached to the upper end of said tube and of such length as to permit a fisherman to lower the desnagger to the depth of the water to be fished;
   the composite of each said tube and said high density weight being of such dimensions and mass that the center of oscillation is within the weight, such that the natural oscillation frequency, in water, of the composite, is within that range of frequencies wherein fishermen can jig the desnagger with the manipulating cord, in unison with the desnagger's natural frequency of oscillation; thereby causing the desnagger to oscillate about its center of oscillation with considerable amplitude and energy; which oscillation energy generates desnagging forces on a snagged lure when the desnagger is lowered, or maneuvered by the fisherman, into the vicinity of a snagged lure, either above or below or on various sides of the snagged lure.

* * * * *

UNITED STATES PATENT AND TRADEMARK OFFICE
CERTIFICATE OF CORRECTION

PATENT NO. : 4,158,928
DATED      : June 26, 1979
INVENTOR(S) : Homer I. Henderson It is certified that error appears in the above-identified patent and that said Letters Patent are hereby corrected as shown below:

Claim 1, line 5, "line" should read --lure--.

Signed and Sealed this

Twenty-second Day of April 1980

[SEAL]

Attest:

SIDNEY A. DIAMOND

*Attesting Officer*          *Commissioner of Patents and Trademarks*